United States Patent [19]

Hudson, Jr. et al.

[11] 4,232,796
[45] Nov. 11, 1980

[54] THERMAL RELEASE PLUG FOR A FABRICATED PRESSURE VESSEL

[75] Inventors: Sharon J. Hudson, Jr., Lambertville, Mich.; Karl T. Petersen, Toledo, Ohio

[73] Assignee: Sharon Manufacturing Company, Toledo, Ohio

[21] Appl. No.: 930,900

[22] Filed: Aug. 4, 1978

[51] Int. Cl.³ ............................................. F16K 17/40
[52] U.S. Cl. .................................... 220/89 B; 137/72
[58] Field of Search ................. 220/201, 89 B, 3, 5 A; 137/72; 228/184

[56] References Cited

U.S. PATENT DOCUMENTS

| | | | |
|---|---|---|---|
| 1,557,250 | 10/1925 | Grandfield | 137/72 X |
| 1,640,190 | 8/1927 | Heinson | 220/428 X |
| 1,654,836 | 1/1928 | Schlesinger | 220/89 B X |
| 1,953,582 | 4/1934 | Belknap | 220/89 B X |
| 2,171,588 | 9/1939 | McGuffey | 220/89 B |
| 3,181,589 | 5/1965 | Phelps | 220/3 X |
| 3,269,402 | 8/1966 | Horner | 220/89 B X |
| 3,432,910 | 3/1969 | Bottum et al. | 228/184 |
| 3,927,791 | 12/1975 | Hershberger | 138/89 X |

Primary Examiner—Allan N. Shoap

[57] ABSTRACT

A thermal release plug for a pressure vessel having a plug well formed in the wall of the vessel. The well contains a circular metal plug member and a low temperature fusible sealant. The well is generally frusto-conical in shape with standoff means to contact the plug at at least three points and thus provide narrow circumferentially disposed arcuate gaps between the plug and the well wall between points of contact. The sealant is fused to the well surface in a furnace under copper brazing conditions.

7 Claims, 4 Drawing Figures

THERMAL RELEASE PLUG FOR A FABRICATED PRESSURE VESSEL

SUMMARY OF THE INVENTION

Generally speaking the invention relates to pressure vessels fabricated from sheet metal members and which require a thermally releasable safety vent. More specifically the invention relates to pressure vessels such as suction accumulators and receivers for use in refrigerant compressing-evaporating systems which vessels are fabricated from two or more sheet metal parts having overlapping seams brazed together in a furnace under a protective atmosphere while simultaneously producing a low melting point safety release plug in the wall of the vessel. To produce the safety plug an inwardly converging generally frusto-conical well having radial undulations is punched in the wall of one of the sheet metal members. The inner end of the well has a vent opening which is closed by a circular metal plug and a low temperature fusible metal sealant. The undulations which may be in the form of flat sections disposed in a chord-like manner at spaced apart locations around the well contact the circular plug member and hold it away a short distance from the remainder of the well surface. The circular plug member is made of steel or other similar high melting temperature metal which will not fuse or deform at the production temperatures involved. The low temperature fusible metal sealant is preferably lead.

When the pressure vessel components have been assembled for brazing the circular plug member is dropped into the well followed by a slug of lead and then placed in a copper brazing furnace for simultaneously seam brazing the pressure vessel members together and fusing the sealant to the well surface and covering the circular plug.

BACKGROUND OF THE INVENTION

This invention is an improvement of the thermal release plug disclosed in copending patent application Ser. No. 727,881 filed Sept. 29, 1976 which was formed under similar conditions but did not utilize a high melting temperature plug member in the well in addition to the low melting temperature metal. Without a plug member the aperture at the bottom of the well had to be kept small because the sealant metal became highly fluid under the production temperatures and as a result could not be retained in the well if the opening were too large. When a large area vent was required a plurality of wells having openings which in the aggregate equaled the required area had to be formed. Attempts to use a high melting point plug sealed in the well by a low melting metal resulted in unreliable release plugs because under the furnace brazing temperature and atmosphere conditions the plug member became bonded directly to the well surface in some instances. The present invention solves this problem by using standoff means in the well to hold a circular plug member away from the well walls except at the points where the standoff means contact the plug member. The remaining peripheral portion of the circular plug not in contact with the standoff means is spaced from the well wall by a gap which is sufficiently narrow to prevent the metal sealant from flowing through the gap during production yet because of its length provides a total area that is comparatively large. Also, if any bonding occurs between the circular plug member and the well it is limited to a minimum number of points and thus does not drastically interfere with the reliable release of the plug.

The invention including the above mentioned features and advantages will be understood best if the written description is read with reference to the accompanying drawings.

DETAILED DESCRIPTION OF THE DRAWINGS

Figure 2:
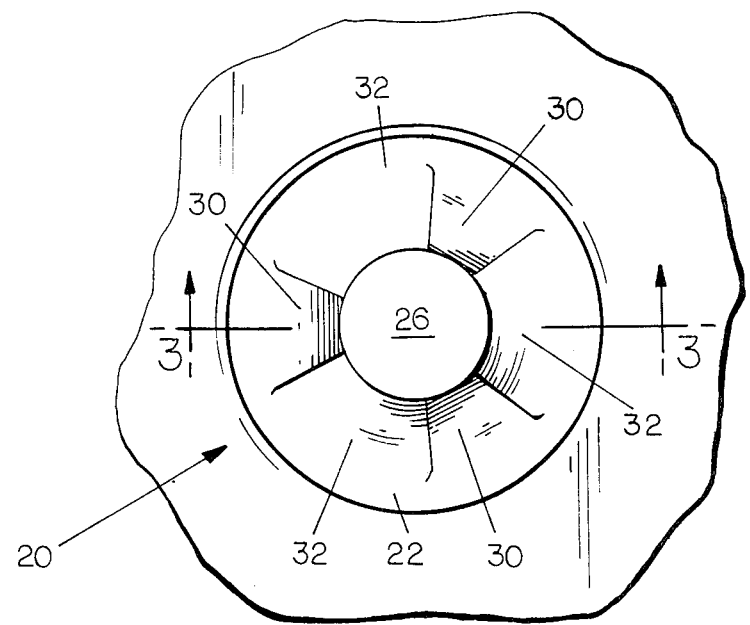
FIG. 2 is an enlarged plan view of the plug well section of the pressure vessel FIG. 1 with a plug member in the bottom of the well but no sealant in the well.
Figure 1:
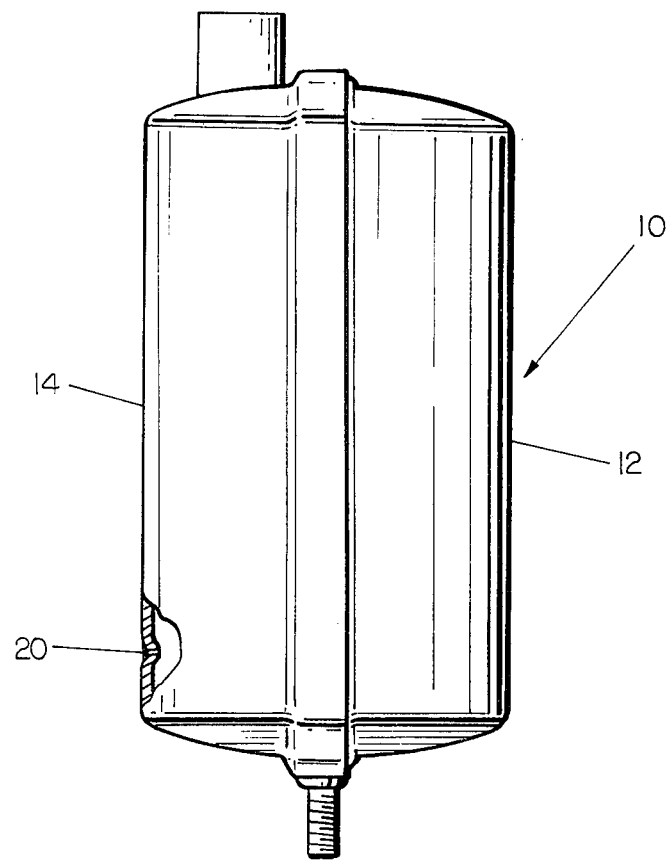
FIG. 1 is a side view of a pressure vessel fabricated from stamped sheet metal parts brazed together with a lower portion of the vessel shell broken away to show the thermal release plug.

Referring to the drawings particularly FIG. 1 the illustrated pressure vessel 10 is made of two sheet metal casing sections 12 and 14 produced by stamping processes. The casing sections 12 and 14 have overlapping peripheral seam sections which are bonded together in a brazing furnace at temperatures ranging from 1000°–1150° C. in a protective atmosphere. Other component parts of the pressure vessel, such as inlet nipples as well as internal baffles, may also be copper brazed at the same time as the seam during one pass through the brazing furnace.

The thermal release plug structure is designed so that its vent opening may be sealed under the same conditions required for copper brazing of the pressure vessel components. The release plug 20 includes a plug well 22 having an opening 24 in bottom, a circular plug 26 partially blocking the opening and a fusible sealant 28.

The plug well 22 is formed directly in the wall of one of the casing sections preferably by a generally conical 70° punch which has had three flat sections ground in its face at equally spaced locations around the punch. The flat sections on the conical punch produce generally triangular planar surfaces 30 each having an equal arc width of about 50° on the well face surface. These planar surfaces radiate upwardly from the vent opening 24 in the bottom of the well and operate as standoff means to hold the circular plug member 26 away from the conical surface portions 32 of the well face by about 0.02 of an inch. The width of the gap may be varied depending upon the sealant metal used. More or fewer standoff elements 30 could be used and they could be in the form of narrow ribs of uniform width rather than generally triangular planar standoffs but the illustrated standoff configurations and arrangement is preferred for simplicity and effectiveness.

Figure 3:
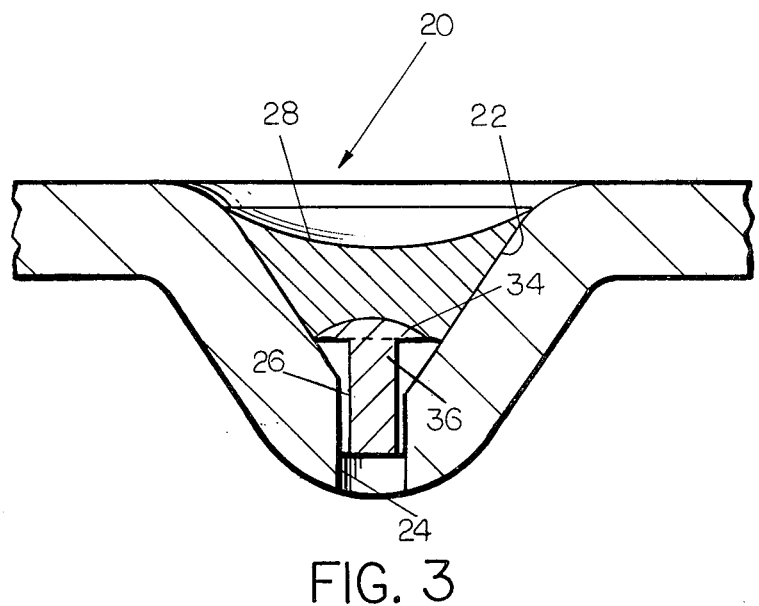
FIG. 3 is a cross sectional view of the well section taken along lines 3—3 of FIG. 2 but with a rivit type plug member sealed and fused in the well by the low temperature fusible sealant.
Figure 4:
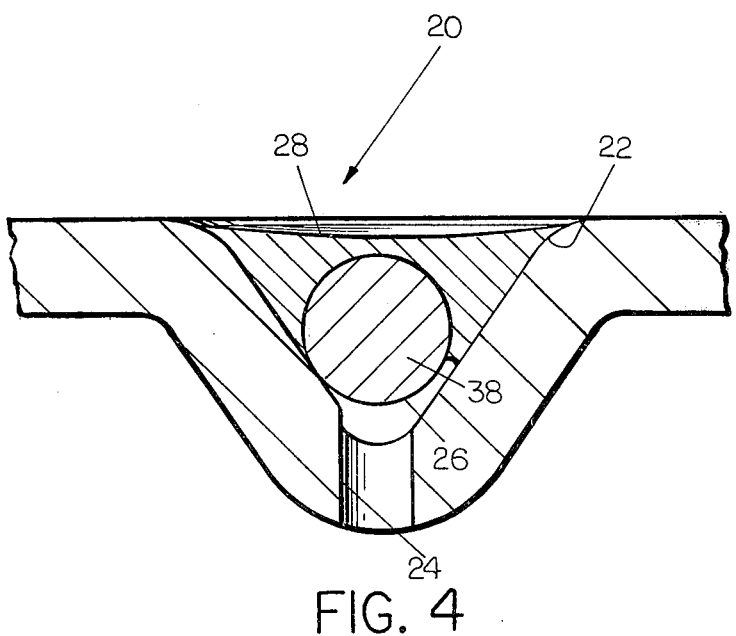
FIG. 4 is a cross sectional view similar to that of FIG. 3 but with a spherical plug member.

The plug member 26 is made of a high melting point metal such as steel and is circular in cross section. It may be in the form of a rivit with a round head 34 and a shank 36 as shown in FIG. 3 or a spherical steel ball 38 as shown in FIG. 4. The outside diameter of the rivit shank 36 is less than the inside diameter of the vent opening 24 to provide clearance between the two surfaces. The diameter of the plug member 26 at the level of contact with the well face flats is selected so that contact occurs in the lower half of the well.

A fusible sealant 28 is used to cover the plug member 26 bridge the arcuate gaps between the periphery of the plug member and the face of the well and thus seal off the vent opening 24. It must have properties which under brazing furnace conditions produce a seal of sufficient structural strength to withstand the pressure limit of the vessel. Preferably the fusible sealant is a low melting temperature metal, such as lead, which has a higher boiling point temperature than the temperature required for the copper brazing of the pressure vessel components.

Manufacture of the pressure vessel and its thermal release plug is completed by preparing and assembling the pressure vessel components for furnace brazing, turning the assembled vessel so its well opening faces upwardly, placing the steel rivit or ball in the well followed by a lead pellet or slug and then passing the assembly through a brazing furnace. Thermal release plugs prepared in this manner display a high degree of uniformity in their release characteristics and are very economical to produce.

While this invention has been described with respect to the illustrated embodiments, it is to be understood that various modifications of the above will be apparent to those skilled in the art without departing from the scope of the invention which is primarily defined by the appended claims.

What is claimed is:

1. A safety vent structure for a pressure vessel fabricated of sheet metal casing sections brazed together, said structure comprising: an inwardly converging generally frusto-conical well formed in the wall of one of said sections, a vent opening in the bottom of said well, a plug member in said well, said plug member having a circular periphery, said well having radially disposed plug standoff means for supporting said plug member at spaced locations around said periphery in contact therewith such that peripheral portions intermediate said locations are spaced from the adjacent inner surface of said well, and a low temperature fusible sealant bridging the space between said plug member periphery and said inner well surface.

2. A safety vent structure according to claim 1 wherein said plug member has a head of circular cross section with a depending cylindrical shank, said shank extends into said vent opening, said shank having outside dimensions which are less than the inside dimensions of said vent opening.

3. A safety vent structure according to claim 1 wherein said plug member is a spherical ball.

4. A safety vent structure according to claim 1 wherein said standoff means comprises at least three equally spaced generally triangular planar sections formed in said generally frusto-conical well.

5. A safety vent structure according to claim 4 wherein said planar sections each cover an arc width of about 50° with respect to the conical well.

6. A safety vent structure according to claim 1 wherein the nominal width of the space between the periphery of the plug member and the face of the well is 0.02 of an inch.

7. A safety vent structure according to claim 1 wherein said sealant is essentially lead.

* * * * *